(12) United States Patent
Hommel

(10) Patent No.: US 9,931,559 B1
(45) Date of Patent: Apr. 3, 2018

(54) FOLDING DISC GOLF CART

(71) Applicant: James Shane Hommel, Santa Cruz, CA (US)

(72) Inventor: James Shane Hommel, Santa Cruz, CA (US)

( * ) Notice: Subject to any disclaimer, the term of this patent is extended or adjusted under 35 U.S.C. 154(b) by 0 days.

(21) Appl. No.: 15/648,922

(22) Filed: Jul. 13, 2017

(51) Int. Cl.
*B62B 3/12* (2006.01)
*A63B 71/00* (2006.01)
*B62B 3/02* (2006.01)
*B62B 3/10* (2006.01)
*B62B 5/08* (2006.01)

(52) U.S. Cl.
CPC .......... *A63B 71/0036* (2013.01); *B62B 3/022* (2013.01); *B62B 3/106* (2013.01); *B62B 3/12* (2013.01); *B62B 5/085* (2013.01); *A63B 2210/50* (2013.01); *B62B 2202/40* (2013.01); *B62B 2205/14* (2013.01); *B62B 2205/30* (2013.01); *B62B 2501/065* (2013.01)

(58) Field of Classification Search
CPC .. B62L 3/12; B62L 33/02; B62L 7/068; B62L 2202/404; B62L 2205/20
See application file for complete search history.

(56) References Cited

U.S. PATENT DOCUMENTS

2007/0108709 A1* 5/2007 Wu ........................... B62B 3/04
280/47.34
2007/0284855 A1* 12/2007 Lin ........................... B62B 3/02
280/651

* cited by examiner

*Primary Examiner* — Bryan A Evans
(74) *Attorney, Agent, or Firm* — Donald R. Boys; Central Coast Patent Agency, LLC

(57) ABSTRACT

A folding cart for disc golf has frame elements allowing the cart to be folded with the elements in close, parallel planes, for storage or transport. In various models, the folding cart has a bag carrier implemented especially for a disc bag, the bag carrier foldable into a parallel plane, a seat also foldable into a parallel plane, a hand-operated brake, and an electric motor drive for driving one of the wheels of the cart.

13 Claims, 7 Drawing Sheets

FOLDING DISC GOLF CART

BACKGROUND OF THE INVENTION

1. Field of the Invention

The present invention is in the field of disc golf carts.

2. Description of Related Art

The popularity of the game of disc golf has seen an exponential rate of growth in recent years. What was traditionally a simple game of players throwing flying discs, such as those manufactured by Frisbee, with a goal to hit various objects, such as trees or posts, has evolved immensely. Today, a typical player may carry three different discs that each serve a purpose: a putter, a midrange, and a driver. Each disc has a different shape, and varying mass to make the disc suitable for specific purposes. More involved players may carry an even greater number of discs, a conservative estimate being approximately 12 discs, to factor in not just intended travel distance for a disc, but also wind conditions, disc flight path characteristics, a player's throwing style, or even disc speed. Taking into consideration other things such as a spare jacket, water bottle, umbrella, a folding stool, or one person carrying discs for multiple people and the carrying load may quickly add up.

Presently, discs are generally carried around in a specialized backpack or duffel bag. A player may set their bag down to pick a disc, throw their disc, and may pick up their bag again as they move to pick up their previously thrown disc and play from a next position. After an extended session of disc golf, the player may feel strain resulting from carrying around a bag of discs as well as the repeated action of bending to pick up their bag. Not to mention soiling of one's bag in dusty or muddy conditions. Therefore, what is clearly needed is a way for disc golf players to conveniently transport their equipment while playing.

BRIEF SUMMARY OF THE INVENTION

In one embodiment of the invention a folding cart for disc golf is provided, comprising a front frame sub-assembly having first and second parallel, elongated frame elements, connected by a horizontally-oriented handle at an upper end, by a first axle at a lower end, and by a coupler bar at a point closer to the lower end than to the upper end, the two parallel elements spaced apart at the lower end by a first dimension accommodating a first wheel on the axle, and by a second dimension, substantially greater than the first dimension, from the coupler bar to the handle, a back frame sub-assembly having third and fourth elongated frame elements separated by a third dimension substantially greater than the second dimension, connected at a lowermost end by a horizontal cross bar having a centrally-located tee element, and having second and third short axels extending horizontally from each end of the horizontal cross bar, the short axels carrying a second a third wheel of common diameter, with the uppermost end of the third elongated frame element connected pivotally to the first elongated frame element of the front frame assembly, and the uppermost end of the fourth elongated frame element connected pivotally to the second elongated frame element of the front frame assembly, such that the back and front frame assemblies may pivot relative to one another around a horizontal axis, a support strut attached pivotally to the coupler bar of the front frame assembly having an end away from the pivoted end enabled to engage a side outlet of the centrally-located tee element of the horizontal cross bar connecting the elongated frame elements of the back frame assembly, the support strut of a length such that, with the support strut engaged in the side outlet of the centrally-located tee, the front and back frame elements are joined such that, with the three wheels on a ground plane, the back frame element stands in a vertical plane, and a disc bag carrier pivotally joined to the first and second elongated frame elements of the front frame assembly, such that the disc bag carrier assembly may fold toward the front frame assembly to lie parallel to the plane of the front frame assembly, or may be deployed forward to a stop, providing a support base for a disc golf bag.

In one embodiment, with the support strut disengaged from the side outlet, the front and back frame sub-assemblies, the support strut, and the disc bag carrier fold together into a compact unit for transport and storage. Also in one embodiment, the individual axels each comprise a quick-release mechanism whereby, by disengaging the quick-release mechanisms, the wheels are removed, providing a more compact unit for transport and storage. Also in one embodiment the cart further comprises a folding seat assembly attached pivotally to the disc bag carrier by two carrier arms supporting a seat base, in a manner that the folding seat assembly folds into a plane parallel to the plane of the front frame sub-assembly when the bag carrier is folded into the plane of the front frame sub-assembly. And in one embodiment, the cart further comprises folding support struts extending from a front edge of the seat base, the support struts resting on the first axle on each side of the first wheel with the seat assembly deployed for use, and foldable into a plane parallel to the plane of the front frame sub-assembly with the folding cart folded.

In one embodiment, the cart further comprises a wheel stop spanning the support struts at a position to contact the first wheel when the seat is deployed and the struts rest on the first axle, the wheel stop locking the first wheel when the seat is used. Also in one embodiment, the first and second elongated frame elements are spaced apart by first dimension, and the bag holder extends away from the elongated frame elements by a dimension enabling the bag holder to carry a bag 9.5 inches in width, and 9.5 inches in depth. Also in one embodiment, a plurality of elements of construction are formed of aluminum tubing. In one embodiment, a plurality of elements of construction are formed of plastic pipe or tubing. And in one embodiment, the cart further comprises fabric carrier bag having attachment interfaces allowing the carrier bag to be attached when the folding cart is erected for use, and allowing the carrier bag to be removed before the folding cart is folded for transport or storage.

In one embodiment, the cart further comprises one or more of a holder for a fold-up tripod seat, a holder for a closed umbrella, a bottle or cup holder, a scorecard holder, and an umbrella clip to hold an umbrella upright, and wherein the holders are each attachable by interfaces enabling attachment and removal. Also in one embodiment, the cart further comprises a hand operated brake sub-system, having a brake friction element actionable on one or more of the wheels of the folding cart, by a hand lever implemented on the horizontally-oriented handle of the front frame sub-assembly. And in one embodiment, the cart further comprises an electric motor enabled to drive one of the wheels, and input controls enabling a user to engage and operate the motor intermittently, leaving the cart unimpeded when the drive is disengaged.

DETAILED DESCRIPTION OF THE INVENTION

What is generally provided is a portable, and compactable, through folding, cart that a disc golf player may use to stow their equipment bag for easy transport while playing disc golf.

Figure 1A:
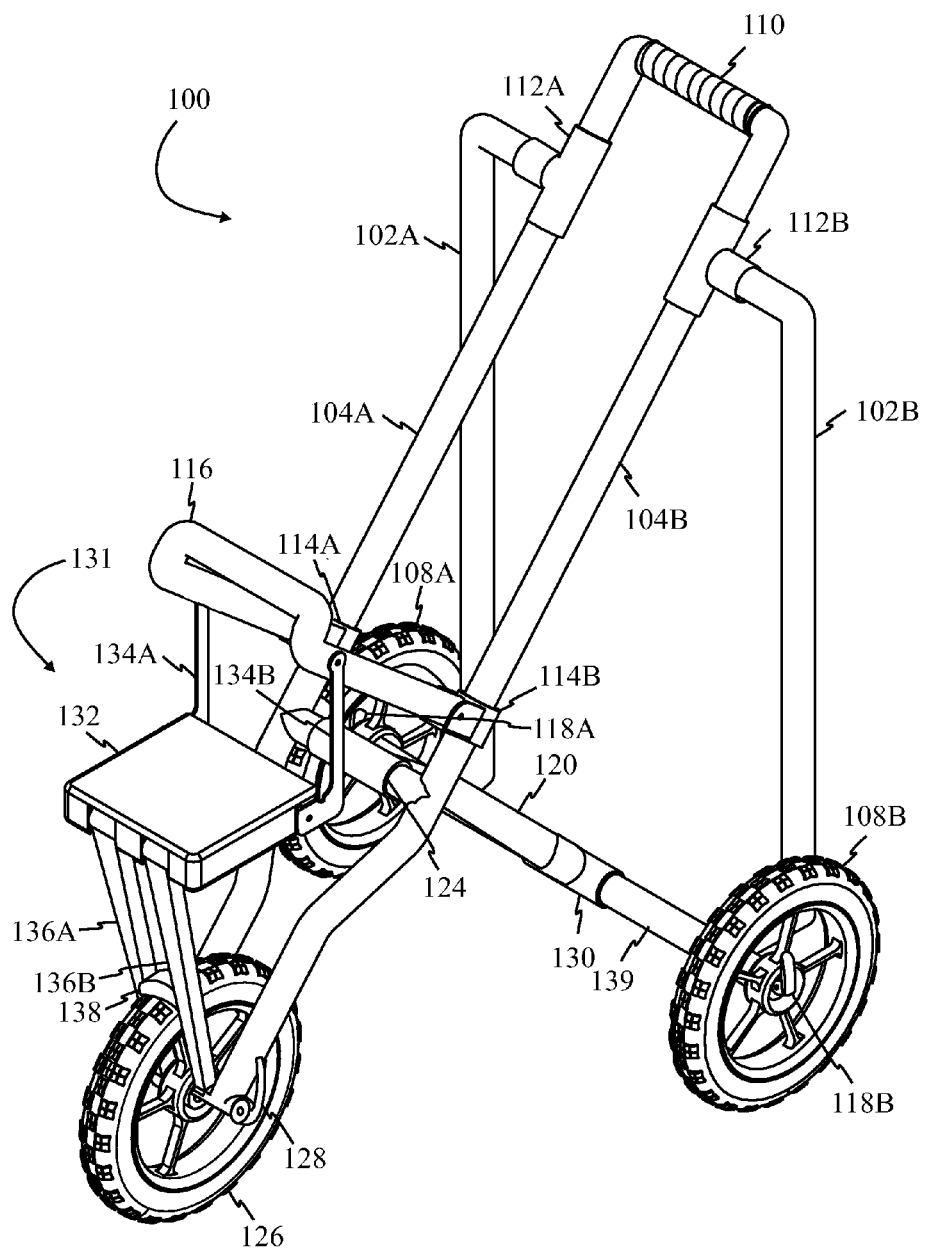
FIG. 1A is an isometric view of a folding disc golf cart according to one embodiment of the present invention.
Figure 1C:
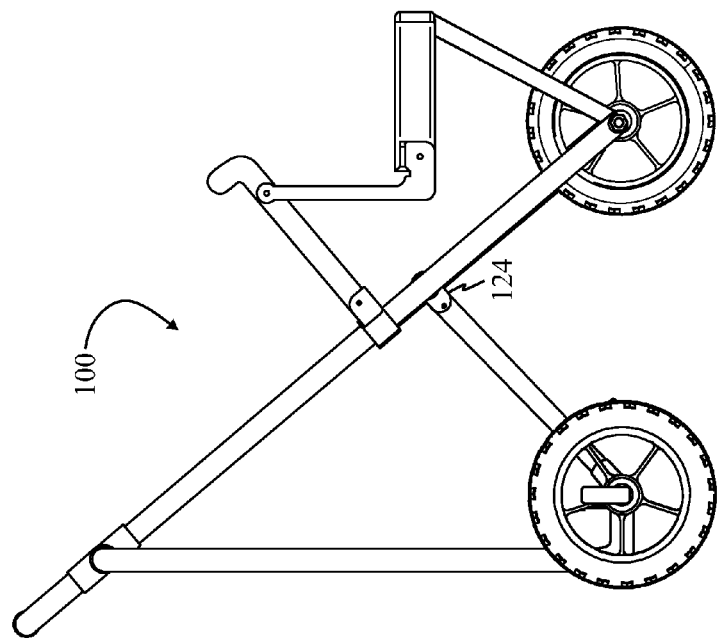
FIG. 1C is a side view of the folding disc golf cart shown in FIG. 1A.
Figure 1B:
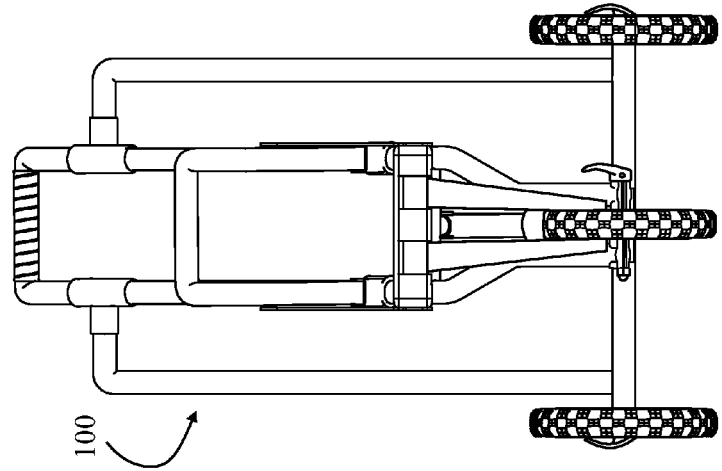
FIG. 1B is a front view of the folding disc golf cart shown in FIG. 1A.

FIGS. 1A to 1C are various views of a disc golf cart 100 according to one embodiment of the present invention. Cart 100 comprises two main rigid assemblies: a back frame, and a front frame connected to one another by two tees with a rotating socket 112A and 112B (henceforth referred to collectively as tees 112). The back frame and front frame are also supported by a support strut 120, which is present between the back and front frame, to prevent collapsing during use. Tees 112 enables the front frame to rotate in a radial fashion around the uppermost portion of the back frame. This allows the cart to be folded up for storage or transport. In one embodiment, the front and back frame may be constructed with aluminum tubing to make the assembly lightweight and sturdy, however, it should be understood, that other sizing, and materials of the construction may be implemented in other embodiments of the present invention. For example, in some embodiments the side rails and some other elements may be plastic tubing or plastic pipe.

The back frame comprises a first back side bar 102A and second back side bar 102B (henceforth referred to collectively as back side bars 102), a first rear wheel 108A, and a second rear wheel 108B (wheels 108A and 108B are referred to collectively as rear wheels 108 going forward). The back frame side bars are spaced apart at a lowermost position by a horizontal frame element 139, which comprises a centrally-positioned tee element 130. The back frame is designed to remain substantially perpendicular to the ground during use. The bottom portion of side bars 102 form an axle, in which rear wheels 108 may connect. In this embodiment, rear wheels 108 are fastened to cart 100 by a first through-axle style quick release mechanism 118A and a second through-axle style quick release mechanism 118B. The through-axle style quick release is commonly used for bike tires. In this embodiment, a rod with a threaded end goes through the center of a rear wheel and fastens into a threaded socket or nut (not shown in FIGS. 1A to 1C, but shown in and covered in FIG. 2B below). The wheels may also be replaced with different types of wheels to make cart 100 more suitable for various terrains. The rear axle may be a single axle through the rear bar, or may be a short axle from each end of the cross bar.

At the uppermost portion of the back frame, side bars 102 are connected to the rotating sockets of tees 112 that point outward, this connection enables the front frame to rotate axially around the top of the back frame and allowing the cart to fold down.

The front frame comprises a handle 110 with a wrapping in some embodiments, a first front side bar 104A and a second front side bar 104B (henceforth referred to collectively as front side bars 104); a bag holder arm 116; a front wheel 126; and a foldout seat assembly 131. Front side bars 104 are held together with a coupler 124 that has a hinge mechanism whose function is detailed below. Coupler 124 holds the side bars together with enough space at the bottommost portion to fit front wheel 126 in between. Front wheel 126 is fastened to the axle of the front frame with a drop-out style quick release 128, which is also commonly used in bike tires, similar to the through-axle style quick release found on the rear tires.

At the uppermost portion of the front frame, side bars 104 are connected to the bottom sockets of crosses 112, while handle 110 is connected to the top sockets of crosses 112. The top and bottom sockets are rigidly connected, and, unlike the side sockets, do not rotate. Bag arm 116 is connected to front side bars 104 by a first cuff 114A and a second cuff 114B (henceforth referred to collectively as cuffs 114). Cuffs 114 have a hinge mechanism which allows bag arm 116 to fold upward, relative to the ground on which the cart is resting, and also restricts the bag arm to substantially perpendicular to the relative position of the front frame while in use. This allows bag arm 116 to support a bag without collapsing.

Bag holder 116 has two side rails that each connect to opposite elongated elements of the front frame sub-assembly, and that form a raised horizontal rim. The space defined between the front-frame sub-assembly and the raised rail, is about ten inches in one embodiment, to hold a bag having a depth of 9.5 inches, and the side rails are spaced apart by about 9.5 inches, or less, to hold the bottom of a bag that is 9.5 inches wide. In some embodiments a flat panel is installed across the side rails, and may extend to some dimension on each side beyond the side rails, to hold bags of a width less the 9.5 inches, or greater than that width.

Connected to bag arm 116 in one embodiment of the invention is a foldout seat assembly 131. Seat assembly 131 comprises a first bracket 134A, and second bracket 134B (henceforth referred to collective as seat brackets 134); a seat 132; a first strut 136A, and a second strut 136B (henceforth referred to collectively as seat struts 136, and a wheel stop 138. Seat brackets 134 connects seat assembly 131 to bag arm 116, and enables a user to fold the seat up when not in use or when cart 100 is in a portable configuration. Seat 132 may be connected to the bottommost portion of bracket 134, and may also fold up to provide extra options in the portable configuration (shown in FIGS. 2A and 2B). Connected to the front of seat 132 are struts 136. Struts 136 may fold up and tuck underneath seat 132 while not in use. During use, struts 136 may rest on the axels of front wheel 126 to provide additional support for the seat when a user sits on seat 132. In between struts 136 is a wheel stopper 138. While a user sits on seat 132, the added weight of the user may push wheel stopper 138 against front wheel 126 to act as a wheel lock to prevent cart 100 from unintentional movement. When no force is applied to seat 132, such as when seat assembly 131 is in the open configuration with no user sitting on seat 132, the stopper may rest in such a position as to allow wheel 126 to move freely, allowing the user to push the cart without the need to foldup seat assembly 131. It should be understood that the foldout seat assembly used in this embodiment is merely an example, and other techniques for the foldout seat may be implemented without deviated from the inventive concept of the present invention.

Support strut 120 is connected to the back frame by tee element 130, and to the front frame by the hinge mechanism found on coupler 124 (the hinge is shown more clearly in FIG. 1C). The side outlet of tee element 130 is a socket 130, in which support strut 120 is inserted, and may be have a relatively loose fitting to allow a user to remove support strut 120 from the socket in order to fold down the cart, but not too loosely as to allow support strut 120 to disengage unintentionally during use. Strut 120 may be held in place by a release pin, as well.

In some embodiments of the cart the handle may connect to the side bars in a telescoping manner, such that the handle height may be adjusted in use. In these embodiments, there may be a mechanism for holding the handle at different positions. Also in some embodiments, the handle may be covered with different fabrics and materials, such as foam rubber, leather, or other materials.

Figure 2A:
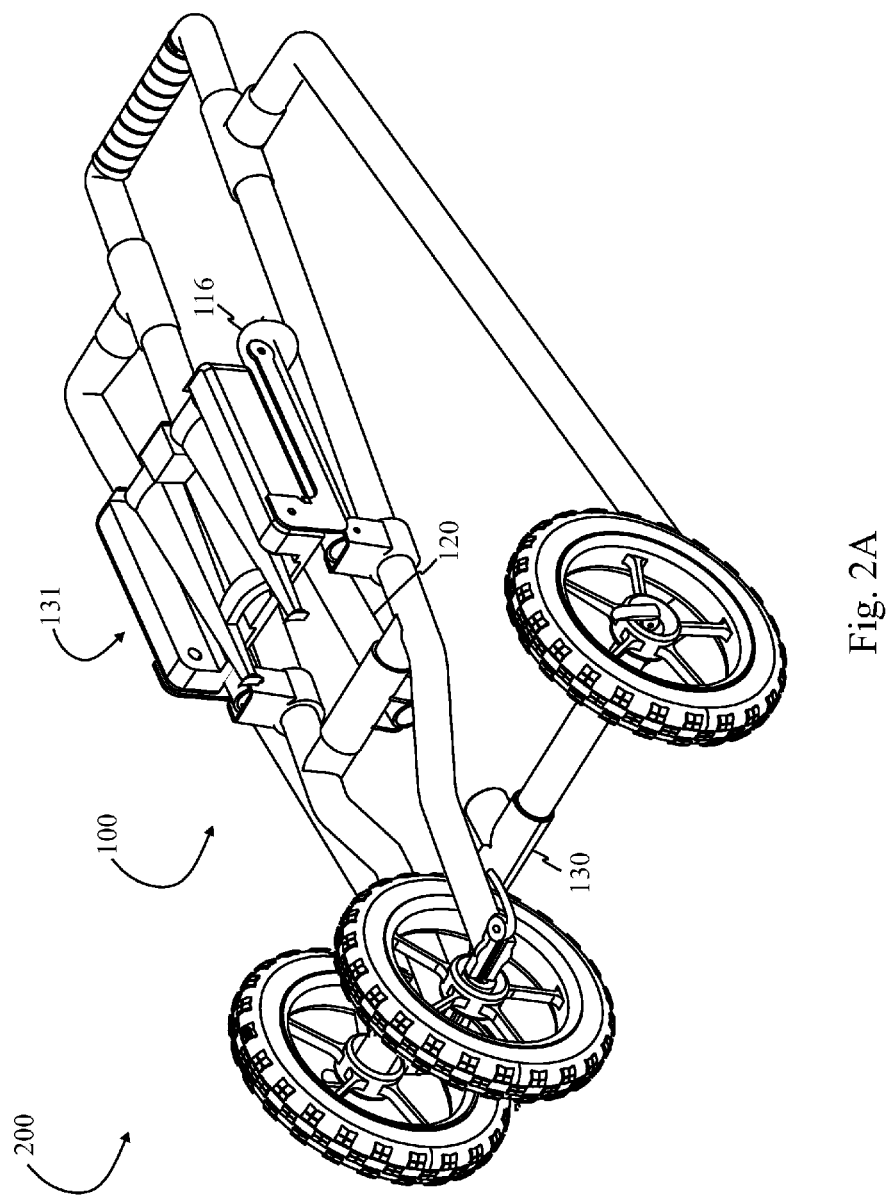
FIG. 2A is an isometric view of a folding disc golf cart in a folded down configuration with wheels still attached according to one embodiment of the present invention.
Figure 2B:
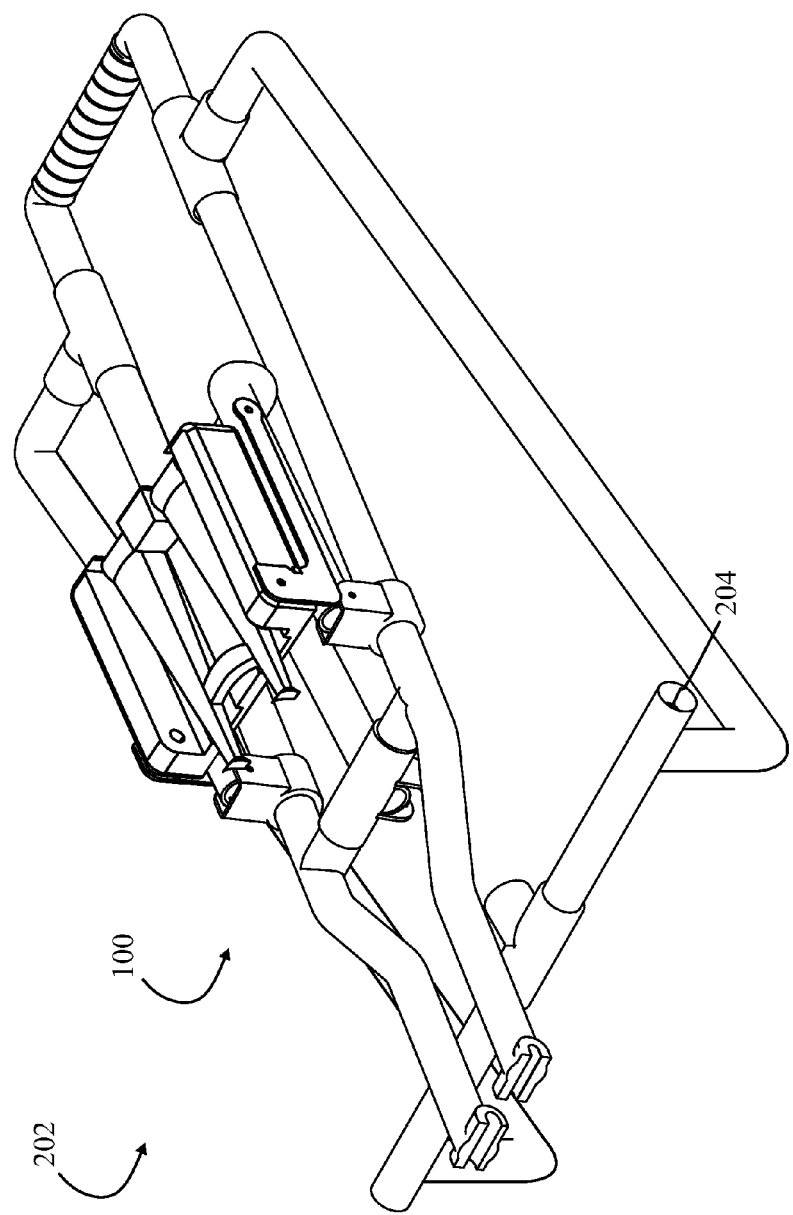
FIG. 2B is an isometric view of the cart from FIG. 2A with the wheels removed.

FIGS. 2A and 2B are different configurations of cart 100 folded up according to one embodiment of the present invention. In FIG. 2A cart 100 is in a compact configuration 200 according to this embodiment of the present invention. During normal use, as in FIGS. 1A to 1C, strut 120 is inserted into a socket of tee 130. For transporting or storage purposes, strut 120 may be removed from tee 130, and the front frame may fold down against the back frame, effectively flattening cart 100. Once the front frame and the back frame are folded, bag arm 116 may also be folded to make cart 100 additionally compact. Seat assembly 131 may also be folded down, with the struts tucked and stored under the seat portion.

FIG. 2B is cart 100 is in an extra-compact configuration 202 according to one embodiment of the present invention. In configuration 202, cart 100 may be folded as in FIG. 2A, however with the wheels removed to make cart 100 even more compact than compact configuration 200. As mentioned above, the front wheel may be removed by the dropout quick release mechanism used in this embodiment, and the rear wheels may use a through-axle style quick release, and may be removed by unfastening the through-axle rod from an embedded threaded socket 204. Although not shown in FIG. 2B, an identical threaded socket may be found on the other side of cart 100. Extra-compact configuration 202 may be suitable for a use case scenario in which a user may need the cart to be further compacted than what is possible with the wheels attached for longer term storage, or more transportation options, such as, but not limited to, with a carrying bag, or to fit under a seat.

Although not shown in the provided drawings for the compact configuration examples above, the front frame may rotate around the back frame, and rest underneath the back frame if additional space is required.

Figures 3A, 3B:
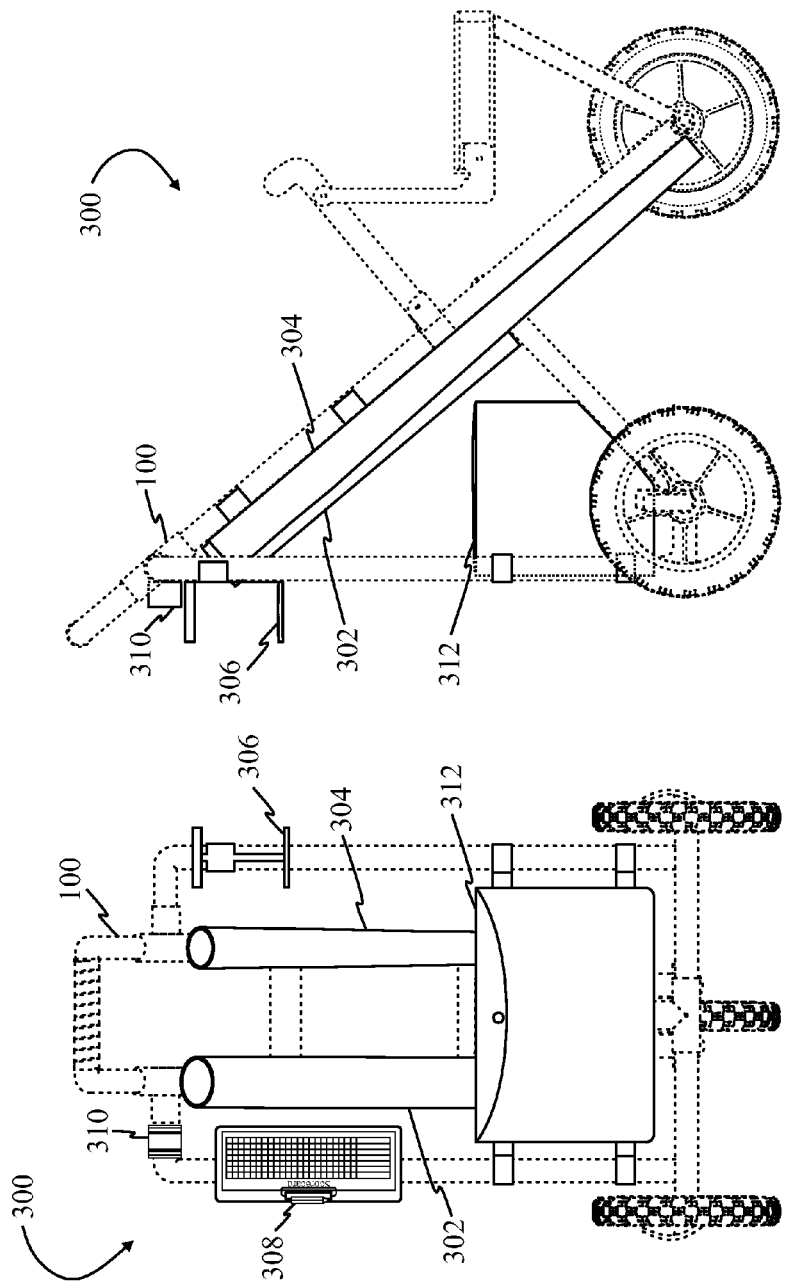
FIG. 3A is a back view of a folding disc golf cart with attached holder accessories according to one embodiment of the present invention.
FIG. 3B is a side view of the folding disc cart shown in FIG. 3A.

FIGS. 3A and 3B are a side rear view, and side view, respectively, of cart 100 with a variety of accessories attached, which will be referred to as accessory-equipped cart 300 according to one embodiment of the present invention. Cart 300, in this embodiment, has a fold-up tripod seat holder 302, a closed umbrella holder 304, a bottle or cup holder 306, a scorecard holder 308, an umbrella clip 310 to hold an umbrella upright, and a storage bag 312. Storage bag 312 may be a storage compartment for items such as a jacket or other personal effects, a cooler to keep beverages, or may be a combination of both. As evident by FIGS. 3A and 3B, accessories may have clips which allows for a modular design, enabling a user to easily attach or detach accessories as the user sees fit. It should be understood that the positioning of the accessories as attached in FIGS. 3A and 3B are not the only possible configurations. Since the cart may use a standard size of piping for construction throughout, accessories may be attached where ever the user decides, given that there is enough space. Additionally, the accessories shown are not meant to be limiting, and other types of accessories may be created and attached without deviating from the inventive concept of the present invention.

Figure 4:
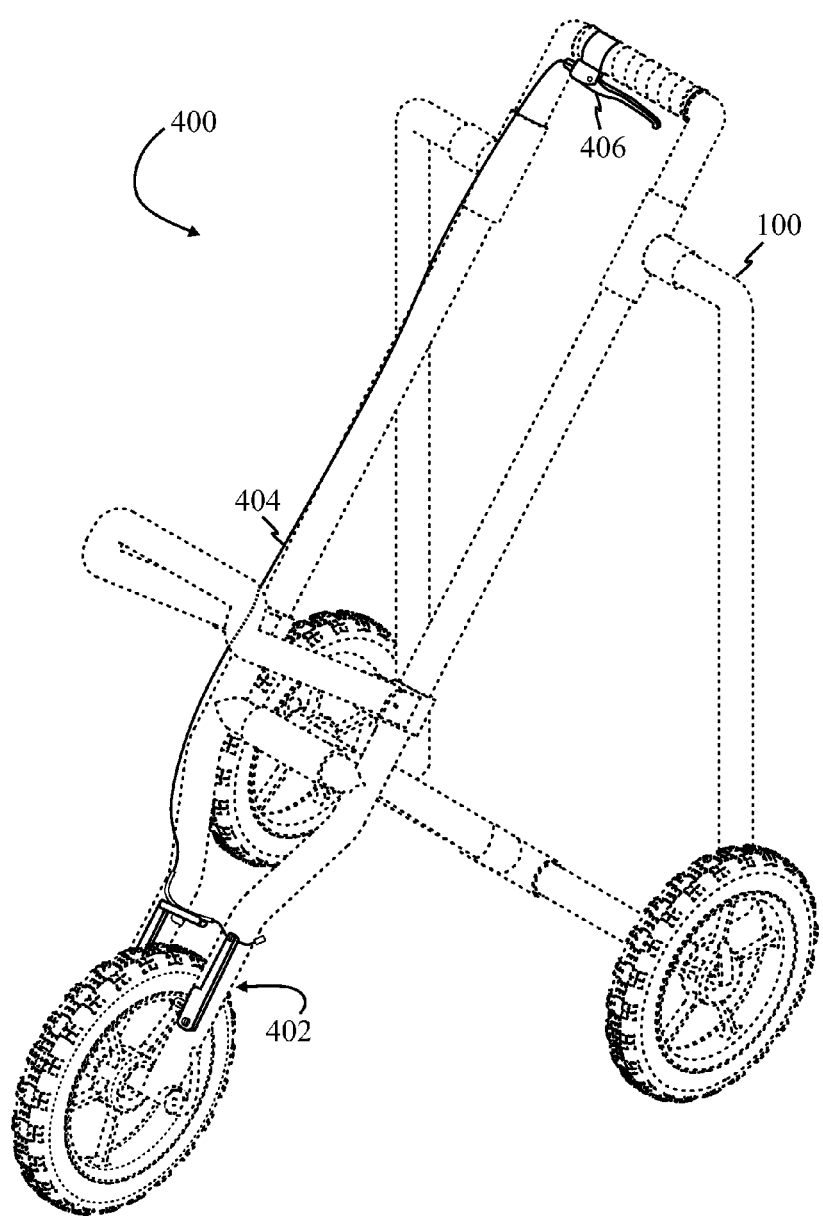
FIG. 4 is an isometric view of a folding disc golf cart with a linear-pull brake installed according to one embodiment of the present invention.

FIG. 4 is a cart 100 with brakes installed according to one embodiment of the present invention. This assembly will be referred to as brake-equipped cart 400. In this embodiment, brake-equipped cart 400 uses a linear-pull brake system commonly used on bicycles, as evident by linear-pull brake assembly 402. Brake assembly 402 may be connect to a brake lever 406 attached to the handle, and brake assembly 402 and lever 406 are connected by a brake line 404. When a user grips lever 406, linear-brake assembly 402 is activated and braking force is applied. It should be understood that although a linear-pull brake system is shown here, the present invention is not limited to a linear-pull brake system. Any form of braking system may be implemented without deviating from the inventive concept of the present invention. In other embodiments, the brake lever may be integrated into the handle of cart 100, as opposed to an external brake lever as shown in FIG. 4.

Figure 5:
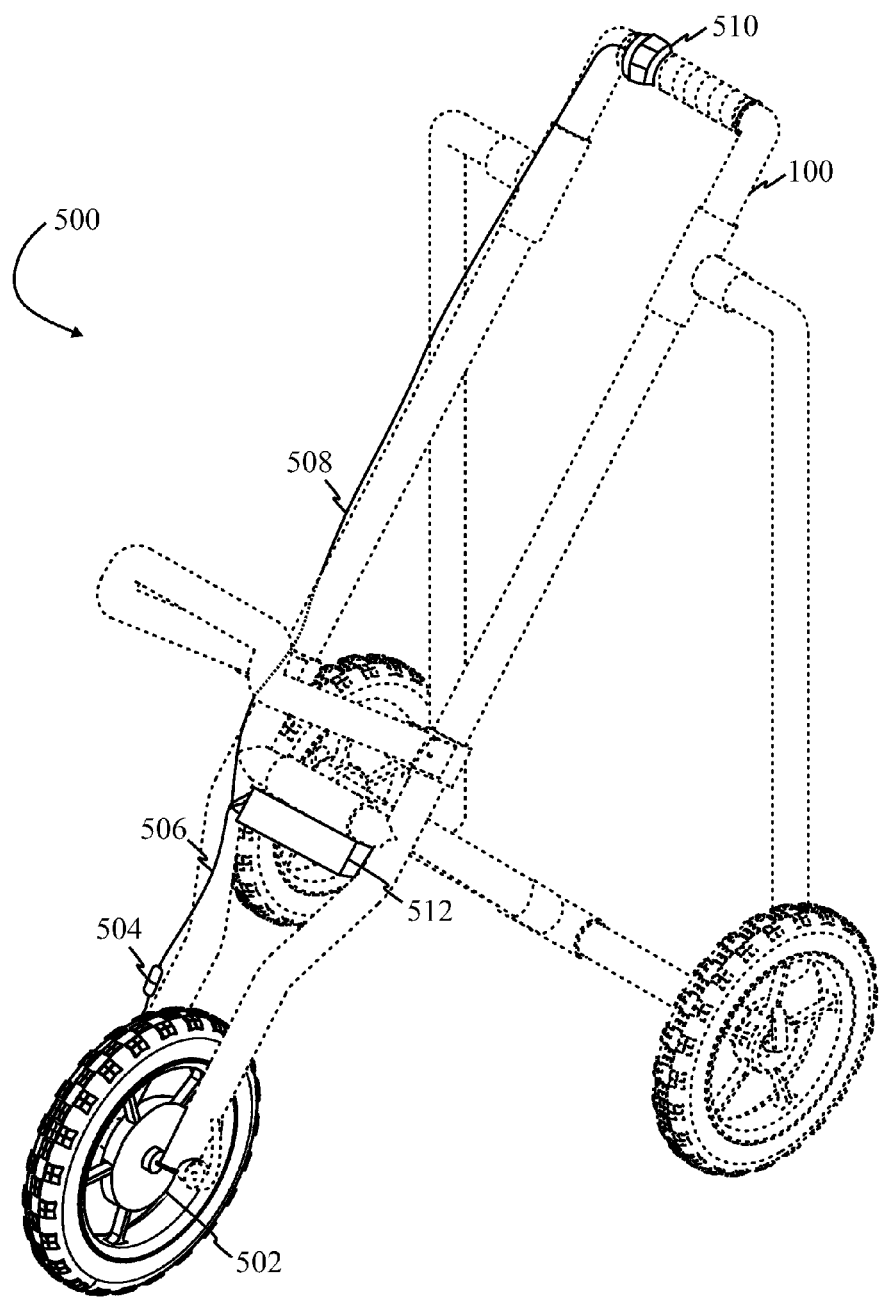
FIG. 5 is an isometric view of a folding disc golf cart with an electric hub motor installed according to one embodiment of the present invention.

FIG. 5 is a cart 100 with an electronic hub motor installed according to one embodiment of the present invention. This assembly will be referred to as motor-assisted cart 500. Motor-assisted systems, one of many types of systems, are commonly found on many electronic bikes. Motor-assisted cart 500 has a central electronics unit 512 which may house a battery, sensors, a processing unit, and other electronics. The sensors may allow central electronics unit 512 to gauge certain conditions in the environment, and, if certain predefined conditions are met, the processing unit may activate an electric hub motor 502 installed in the front wheel of cart 500 to provide movement assistance. The hub motor is connected to central electronics unit 512 by an auxiliary plug 504, and cable 506. Cable 506 may form a data link between central electronics unit 512 and control hub motor 502, as well carry power connections. Motor-assisted cart 500 may have a controller 510 mounted to the handle of the cart, and connected to central electronics unit 512 with cable 508. The controller may allow a user to select a mode in which central electronics unit 512 may activate hub motor 502. For example, there may be an option where the motor-assistance does not activate until the sensors in central unit 512 determines that a user is pushing cart 500 uphill, or even an option to activate any time a user pushes cart 500.

Generally, disc golf may be a slower-paced game where people may be closer together, and for this reason this embodiment may not have throttle capabilities to maintain a safer environment for other players. However, an embodiment of a cart with throttle is not precluded from the inventive concept of the present invention. In other embodiments, as an extra measure of safety, there may be a grip sensor installed on the handle bar of the cart to allow the sensors to determine, with greater accuracy, the intentions of the user regarding the movement of the cart. In other embodiments, still, the hub motor may have regenerative braking capabilities which may allow the central unit to effectively slow the cart meanwhile receiving a small charge from the braking.

Although in the above examples, each of the implementations to cart 100 is shown in their own figures, it should be understood that the implementations are not mutually exclusive to one another. Any combination from the examples above may be used in any single embodiment, as well as other implementations that may not have been covered here without diverging from the inventive concept of the present invention.

It will be apparent to one with skill in the art, that the embodiments described above are specific examples of a single broader invention which may have greater scope than any of the singular descriptions taught. There may be many alterations made in the descriptions without departing from the spirit and scope of the present invention.

The invention claimed is:

1. A folding cart for disc golf, comprising:
a front frame sub-assembly having first and second parallel, elongated frame elements, connected by a horizontally-oriented handle at an upper end, by a first axle at a lower end, and by a coupler bar at a point closer to the lower end than to the upper end, the two parallel elements spaced apart at the lower end by a first dimension accommodating a first wheel on the axle, and by a second dimension, substantially greater than the first dimension, from the coupler bar to the handle;
a back frame sub-assembly having third and fourth elongated frame elements separated by a third dimension substantially greater than the second dimension, connected at a lowermost end by a horizontal cross bar having a centrally-located tee element, and having second and third short axels extending horizontally from each end of the horizontal cross bar, the short axels carrying a second a third wheel of common diameter, with the uppermost end of the third elongated frame element connected pivotally to the first elongated frame element of the front frame assembly, and the uppermost end of the fourth elongated frame element connected pivotally to the second elongated frame element of the front frame assembly, such that the back and front frame assemblies may pivot relative to one another around a horizontal axis;
a support strut attached pivotally to the coupler bar of the front frame assembly having an end away by the pivoted end enabled to engage a side outlet of the centrally-located tee element of the horizontal cross bar connecting the elongated frame elements of the back frame assembly, the support strut of a length such that, with the support strut engaged in the side outlet of the centrally-located tee, the front and back frame elements are joined such that, with the three wheels on a ground plane, the back frame element stands in a vertical plane; and
a disc bag carrier pivotally joined to the first and second elongated frame elements of the front frame assembly, such that the disc bag carrier assembly may fold toward the front frame assembly to lie parallel to the plane of the front frame assembly, or may be deployed forward to a stop, providing a support base for a disc golf bag.

2. The folding cart of claim 1 wherein, with the support strut disengaged from the side outlet, the front and back frame sub-assemblies, the support strut, and the disc bag carrier fold together into a compact unit for transport and storage.

3. The folding cart of claim 2, wherein the individual axels each comprise a quick-release mechanism whereby, by disengaging the quick-release mechanisms, the wheels are removed, providing a more compact unit for transport and storage.

4. The folding cart of claim 1 further comprising a folding seat assembly attached pivotally to the disc bag carrier by two carrier arms supporting a seat base, in a manner that the folding seat assembly folds into a plane parallel to the plane of the front frame sub-assembly when the bag carrier is folded into the plane of the front frame sub-assembly.

5. The folding cart of claim 4 further comprising folding support struts extending from a front edge of the seat base, the support struts resting on the first axle on each side of the first wheel with the seat assembly deployed for use, and foldable into a plane parallel to the plane of the front frame sub-assembly with the folding cart folded.

6. The folding cart assembly of claim 5 further comprising a wheel stop spanning the support struts at a position to contact the first wheel when the seat is deployed and the struts rest on the first axle, the wheel stop locking the first wheel when the seat is used.

7. The folding cart of claim 1 wherein the first and second elongated frame elements are spaced apart by first dimension, and the bag holder extends away from the elongated frame elements by a dimension enabling the bag holder to carry a bag 9.5 inches in width, and 9.5 inches in depth.

8. The folding cart of claim 1 wherein a plurality of elements of construction are formed of aluminum tubing.

9. The folding cart of claim 1 wherein a plurality of elements of construction are formed of plastic pipe or tubing.

10. The folding cart of claim 1 further comprising a fabric carrier bag having attachment interfaces allowing the carrier bag to be attached when the folding cart is erected for use, and allowing the carrier bag to be removed before the folding cart is folded for transport or storage.

11. The folding cart of claim 1 further comprising one or more of a holder for a fold-up tripod seat, a holder for a closed umbrella, a bottle or cup holder, a scorecard holder, and an umbrella clip to hold an umbrella upright, and wherein the holders are each attachable by interfaces enabling attachment and removal.

12. The folding cart of claim 1 further comprising a hand operated brake sub-system, having a brake friction element actionable on one or more of the wheels of the folding cart, by a hand lever implemented on the horizontally-oriented handle of the front frame sub-assembly.

13. The folding cart of claim 1 further comprising an electric motor enabled to drive one of the wheels, and input controls enabling a user to engage and operate the motor intermittently, leaving the cart unimpeded when the drive is disengaged.

* * * * *